United States Patent Office 3,251,750
Patented May 17, 1966

3,251,750
PURIFICATION OF CELLULASE
Ichiro Tanaka, Jiro Sawada, and Testuo Misaki, Tokyo, Shozo Kouchiwa, Kamakura, and Kyouko Fukuda, Iruma-gun, Japan, assignors to Taisho Pharmaceutical Co., Ltd., Tokyo, Japan, a corporation of Japan
No Drawing. Filed Apr. 23, 1964, Ser. No. 362,164
Claims priority, application Japan, May 1, 1963, 38/22,323
8 Claims. (Cl. 195—66)

The present invention relates to a novel method of preparing a highly purified cellulase from wheat bran koji inoculated with a Black Aspergillus microorganism, such as *Aspergillus niger*.

In the case of extracting wheat bran koji of a Black Aspergillus, e.g. *Aspergillus niger* with water, the extracted solution, in general, has a blackish-brown color due to the influence both of black spores and the moisture of the cultured medium. Moreover, the extract is hard to clarify, even by centrifugation and though the centrifugation is carried out at high speed. As the result, the crude cellulase preparation precipitated with a hydrophilic organic solvent such as ethanol is colored black or ashy-white, and this impairs the value of the product. On the other hand, it is known that a white enzymic preparation may be obtained by treating the colored extract according to conventional decolorizing methods prior to precipitation with hydrophilic organic solvent. However, these methods, generally reduce the enzymic activity of the cellulase remarkably.

It is therefore an object of the present invention to provide a new and useful method of decolorizing and purifying the crude enzyme solution of cellulase from wheat bran koji inoculated with a Black Aspergillus microorganism such as *Aspergillus niger*.

It is a further object to provide a method by which the enzyme is so decolorized and purified as to be obtained with a comparatively high activity as compared with that of enzyme prepared from the solution conventionally extracted with water directly.

According to the present invention, the crude enzyme solution is decolorized favorably and easily, and recovered with a high activity, by first drying the cultured koji and then extracting it with aqueous acid.

In the preferred embodiment of the present invention a high active cellulase-producing microorganism, *Aspergillus niger*, is employed. The incubated wheat bran koji is dried once for 2–4 hours at 55–65° C., and then is extracted with $\frac{1}{10}$–$\frac{1}{50}$ molal lactic acid, acetic acid or hydrochloric acid solution. The enzyme solution is obtained in a highly clarified state. The enzyme solution thus obtained is treated with hydrophilic organic solvent to precipitate the enzyme preparation.

The drying treatment is necessary for a satisfactory result, having an enhanced decolorization effect. Moreover, even if the drying treatment is carried out for many hours in the range of 55–65° C., little reduction of enzymic activity is found. In case of extracting the cultured wheat bran with acid after the drying treatment, a more effective result is found when using dilute acid, than when using concentrated acid.

The drying step according to the invention is also indispensible in the case that the extraction of the incubated koji is effected with water. The cellulolytic activity and the degree of decolorization of the crude enzyme cellulase solution and the enzyme cellulase preparation obtained by extraction with water or acids after drying are shown in Table I.

TABLE I

The cellulolytic activity and the degree of decolorization of crude enzyme cellulase solution and enzyme cellulase obtained by extraction with water or acid after drying.

[NOTE.—"u./100 ml."=units per 100 milliliters; "u./g."=units per gram]

| Extracting method | Activity of crude enzyme solution, u./100 ml. | Yield of enzyme cellulase, g./100 ml. | Activity of enzyme cellulase, u./g. | Recovery of activity, percent | Color |
|---|---|---|---|---|---|
| Extracting with water with no previous drying. | 14,550 | 0.6890 | 9,580 | 45.4 | Black. |
| Extracting with water after drying. | 13,810 | 0.5396 | 13,050 | 51.0 | Ashy-white. |
| Extracting with acetic acid after drying. | 14,070 | 0.5382 | 14,630 | 56.0 | White. |
| Extracting with lactic acid after drying. | 13,950 | 0.5058 | 14,290 | 51.8 | Do. |

The quantity of water or acid is 5-fold the quantity of the wheat bran by weight and the loss in quantity of the cultured wheat bran caused by drying is adjusted by the increasing with the volume of extracting. After extracting for 3 hours at 30° C., the pH of the extract is adjusted to 5.50 before ethanol is added to the extract solution up to 70% by weight final concentration at the temperature of 0° C.

Table II shows the cellulolytic activity and degree of decolorization of enzyme cellulase preparation obtained by the same procedure as that described in connection with Table I after the cultured koji is extracted with acid solution directly.

TABLE II

The cellulolytic activity and the degree of decolorization of crude enzyme cellulase solution and enzyme cellulase obtained by the extraction with water or acid with previous drying.

[NOTE.—"u./100 ml."=units per 100 milliliters; "u./g."=units per gram]

| Extracting method | Activity of crude enzyme solution, u./100 ml. | Yield of enzyme cellulase, g./100 ml. | Activity of enzyme cellulase, u./g. | Recovery of activity, percent | Color |
|---|---|---|---|---|---|
| Extracting with water | 7,200 | 1.0359 | 2,965 | 4.27 | Black. |
| Lactic acid solution: | | | | | |
| M/50 | 7,225 | 0.9624 | 4,100 | 54.6 | Light ashy white. |
| M/10 | 6,940 | 0.6206 | 5,300 | 47.6 | White. |
| Extracting with water | 11,750 | 0.8941 | 6,460 | 49.2 | Black. |
| Acetic acid solution: | | | | | |
| M/50 | 11,400 | 0.8423 | 7,500 | 57.8 | Ashy-white. |
| M/10 | 10,940 | 0.8100 | 7,210 | 51.1 | White. |
| Extracting with water | 8,850 | 0.7016 | 4,560 | 36.4 | Black. |
| Hydrochloric acid solution: | | | | | |
| M/30 | 9,040 | 0.5682 | 8,250 | 51.8 | Ashy-white. |
| M/10 | 8,700 | 0.5562 | 7,740 | 48.8 | Do. |

In the case of extracting the incubated koji with 1/10 M organic acid or mineral acid for 3 hours at 30° C., the pH of the extracted solution goes down to the range of about pH 3.0. However, reduction of the enzymic activity is almost negligible.

As described in the above, the crude enzyme solution which is extracted from the cultured koji with water after having been dried or the crude enzyme solution which is extracted from the koji with organic acid or hydrochloric acid directly, is more clear than the solution extracted from the koji with water directly.

The decolorized enzyme preparation is obtained in highly purified form from the enzyme solution, so that the recovery of enzymic activity of the enzyme preparation obtained according to the present invention is greater than that of the enzyme obtained by a conventional method.

The invention is disclosed in further detail by the following examples which are provided for the purpose of illustration only and are not intended to limit the invention in spirit or in scope.

Example 1

5 parts by weight of wheat bran and 1 part by weight of chaff are mixed with 3 parts by weight of water, and 90 kilograms of the thus-prepared solid medium are sterilized for 30 minutes at 125° C. After cooling to 40° C., 0.5% by weight of *Aspergillus niger* TPR–3801 seed koji are inoculated into the sterilized medium. The inoculated wheat bran is placed in an incubator for 72 hours at 30° C.

The so-obtained koji is dried for 3 hours at 60° C. after stirring thoroughly, and then there are added 265 liters of 1/50 molal lactic acid solution, in which the koji is then soaked for 3 hours at 30° C., after which it is filtered by means of a Sharples centrifuge and 170 liters of crude enzyme solution thus obtained.

The pH of the enzyme solution is adjusted to 5.50 with hydrochloric acid, and then 95% ethanol is added slowly up to 70% by weight final concentration at 0° C., after which the whole is then allowed to stand over-night.

A precipitate is thus formed which is centrifuged off by means of a Sharples centrifuge and collected, and then washed with 99% ethanol and dried at 30° C. in vacuo. As a result, 850 grams of white enzyme preparation having 14,290 units/gram is obtained from the extract which has a cellulolytic unit of 13,900 units/100 milliliters. The recovery of activity amounts to 51.2%.

Example 2

5 parts of wheat bran and 1 part of chaff are mixed with 3 parts of water, and 90 kilograms of the thus-prepared solid medium are sterilized for 30 minutes at 125° C. and after being cooled to 40° C., inoculated with 0.5% *Aspergillus niger* TPR–3801 seed koji. The inoculated wheat bran is placed in an incubator for 72 hours at 30° C.

The so-obtained koji is soaked thoroughly in 250 liters of 1/50 molal aqueous acetic acid solution for 3 hours at 30° C. and filtered, 160 liters of crude enzyme solution being thus obtained.

The cellulolytic activity of the enzyme solution is 10,650 units/100 milliliters. The working up proceeds as in Example 1 and 1114 grams of white enzyme preparation having the activity of 8,360 units/gram are obtained. The recovery of the activity amounts to 54.6%.

Example 3

To a medium cultured in the same manner as in Example 1, there are added 250 liters of 1/30 molal hydrochloric acid solution, in which the medium is soaked completely for 3 hours at 30° C. The yield of crude enzyme solution is 160 liters. The cellulolytic activity of the enzyme solution is 10,890, units/100 milliliters.

The working up proceeds as in Example 1, 1,130 grams of white enzyme preparation having the activity of 8,250 units/gram are obtained. The recovery of the activity amounts to 53.4%.

The cellulolytic activity "unit" of the enzyme preparations obtained in Examples 1, 2 and 3 is calculated as follows:

The activity which reduces the viscosity of 25 milliliters of 0.8% by weight carboxymethylcellulose (substrate) by one-half for one minute at a temperature of 40° C. is determined to be equal to one unit. The substrate is made by adding 0.1 molal acetic acid buffer solution to 1.6% by weight carboxymethylcellulose aqueous solution isovolumetrically.

Accordingly, when A milligrams of a sample of enzyme reduces by one-half the viscosity of the above substrate for T seconds, the cellulolytic activity unit of this enzyme per gram is calculated according to the following formula:

$$\text{Cellulolytic activity unit} = 25 \times \frac{1}{A} \times \frac{60}{T} \times 10^3$$

What is claimed is:

1. In a method of obtaining a cellulase preparation from a clarified enzymic solution by solvent extraction from the incubated koji of a cellulase-producing Black Aspergillus microorganism, the improvement of subjecting the incubated koji prior to the solvent extraction treatment to drying for 2 to 4 hours at 55–65° C., whereby a decolorized cellulase of high purity and enhanced cellulolytic activity is obtained.

2. In a method of obtaining a cellulase preparation from a clarified enzymic solution by solvent extraction by means of water from the incubated koji of a cellulase-producing Black Aspergillus microorganism, the improvement of subjecting the incubated koji prior to the solvent extraction treatment to drying for 2 to 4 hours at 55–65° C., whereby a decolorized cellulase of high purity and enhanced cellulolytic activity is obtained.

3. In a method of obtaining a cellulase preparation from a clarified enzymic solution by solvent extraction from the incubated koji of a cellulase-producing Black Aspergillus microorganism, the improvement wherein the solvent extraction is effected with dilute aqueous acid selected from the group consisting of lactic acid, acetic acid and hydrochloric acid, the acid being of 1/10 M–1/50 M strength, whereby a decolorized cellulase of high purity and enhanced cellulolytic activity is obtained.

4. In a method of obtaining a cellulase preparation from a clarified enzymic solution by solvent extraction from the incubated koji of a collulase-producing Black Aspergillus microorganism, the improvement wherein the solvent extraction is effected with dilute aqueous acid selected from the group consisting of lactic acid, acetic acid and hydrochloric acid, the acid being of 1/10 M–1/50 M strength, and wherein the incubated koji is subjected prior to the solvent extraction to drying for 2 to 4 hours at 55–65° C., whereby a decolorized cellulase of high purity and enhanced cellulolytic activity is obtained.

5. The process according to claim 1 where the microorganism is *Aspergillus niger*.

6. The process according to claim 2 where the microorganism is *Aspergillus niger*.

7. The process according to claim 3 where the microorganism is *Aspergillus niger*.

8. The process according to claim 4 where the microorganism is *Aspergillus niger*.

References Cited by the Examiner
UNITED STATES PATENTS
3,075,886   1/1963   Cayle _____ 195—66

A. LOUIS MONACELL, *Primary Examiner.*

L. M. SHAPIRO, *Assistant Examiner.*